United States Patent
Martens et al.

(10) Patent No.: US 10,017,063 B2
(45) Date of Patent: Jul. 10, 2018

(54) ELECTRICAL DISTRIBUTOR ARRANGEMENT

(71) Applicant: Dr. Ing. h.c. F. Porsche Aktiengesellschaft, Stuttgart (DE)

(72) Inventors: Sascha Martens, Stuttgart (DE); Timo Wetzel, Bad Rappenau (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 119 days.

(21) Appl. No.: 15/172,802

(22) Filed: Jun. 3, 2016

(65) Prior Publication Data

US 2017/0028860 A1 Feb. 2, 2017

(30) Foreign Application Priority Data

Jul. 29, 2015 (DE) .......................... 10 2015 112 346

(51) Int. Cl.
| | |
|---|---|
| *B60L 1/00* | (2006.01) |
| *B60L 11/18* | (2006.01) |
| *B60R 16/03* | (2006.01) |
| *H02J 7/00* | (2006.01) |

(52) U.S. Cl.
CPC .......... *B60L 11/1818* (2013.01); *B60R 16/03* (2013.01); *H02J 7/0042* (2013.01); *Y02T 10/7005* (2013.01)

(58) Field of Classification Search
CPC .............. B60L 11/1818; Y02T 10/7005; H02J 7/0042; B60R 16/03
See application file for complete search history.

(56) References Cited

U.S. PATENT DOCUMENTS

| 6,707,369 B2 | 3/2004 | Morimoto |
| 9,004,926 B2 | 4/2015 | Ozawa |
| 2005/0162795 A1* | 7/2005 | Leiber ................ B60R 16/03 361/93.1 |

(Continued)

FOREIGN PATENT DOCUMENTS

| DE | 102012210999 | 1/2013 |
| DE | 102013102575 | 4/2014 |
| DE | 102014216762 | 2/2016 |

(Continued)

OTHER PUBLICATIONS

German Search Report for German Application No. 102015112346.0. dated May 23, 2016.

(Continued)

*Primary Examiner* — Jared Fureman
*Assistant Examiner* — Duc M Pham
(74) *Attorney, Agent, or Firm* — RatnerPrestia

(57) ABSTRACT

An electrical distributor arrangement, in particular for electrically driven motor vehicles, having a housing which has two electrical terminals which are connectable in each case to an external electrical energy source, a multiplicity of through lines which are connected at their ends in each case to one of the terminals, and a multiplicity of electrical attachment lines which are led into the housing for the purposes of electrically contacting a multiplicity of electrical consumers with the through lines, wherein the through lines are in the form of rigid current rails, and wherein the attachment lines are fixedly connected in each case to one of the current rails.

10 Claims, 2 Drawing Sheets

(56) References Cited

U.S. PATENT DOCUMENTS

2012/0013308 A1* 1/2012 Briane .................. H02J 7/02
320/137
2014/0368160 A1* 12/2014 Reichow ............... H02J 1/08
320/107

FOREIGN PATENT DOCUMENTS

| JP | 11176541 A | 7/1999 |
| JP | 2009202677 A | 9/2009 |

OTHER PUBLICATIONS

English translation of the Chinese Office Action for Chinese Application No. 2016106073221, dated Mar. 21, 2018, 3 pages.

* cited by examiner

ELECTRICAL DISTRIBUTOR ARRANGEMENT

CROSS-REFERENCE TO RELATED APPLICATIONS

This application claims priority to German Patent Application No. 10 2015 112 346.0, filed Jul. 29, 2015, which is incorporated by reference herein in its entirety.

FIELD OF THE INVENTION

The present invention relates to an electrical distributor arrangement, in particular for electrically driven motor vehicles, having a housing which has two electrical terminals which are connectable in each case to an external electrical energy source, a multiplicity of through lines which are connected at their ends in each case to one of the electrical terminals, and having a multiplicity of electrical attachment lines which are led into the electrical housing for the purposes of electrically contacting a multiplicity of electrical consumers with the through lines.

The present invention also relates to a motor vehicle, in particular an electrically driven motor vehicle, having two separate electrical attachment sockets for the purposes of electrically connecting the motor vehicle to one or multiple electrical energy sources.

BACKGROUND

Such electrical distributor arrangements serve for the distribution of electrical energy from an external electrical energy source in the motor vehicle, and providing the corresponding electrical voltage to different electrical consumers of the motor vehicle.

Electrical distributor arrangements, in particular for motor vehicles, commonly have a power bus line, which is led into a distributor housing and connected to an electrical energy source, and multiple attachment lines, which are connected to various electrical consumers. The attachment lines are electrically connected, in the distributor housing, to the power bus line in order to provide the electrical voltage to the electrical consumers separately. An electrical distributor arrangement of said type is known for example from U.S. Pat. No. 6,707,369 B2, which is incorporated by reference herein. The electrical attachment lines of said distributor arrangement are fixed to a circuit board adjacent to the power bus line, and are separately electrically contacted in each case with the power bus line by way of wire-bonded connections.

Here, it is a disadvantage that the electrical connection of the attachment lines to the power bus line is technically cumbersome and expensive.

It is furthermore known for individual electrical lines to be led into a distributor housing and for the electrical lines to be contacted with one another in the interior of the distributor housing by way of individual cables, in order to realize a corresponding distribution of the electrical power. It is a disadvantage here that the electrical contacting of the attachment lines in the interior of the housing is possible only after the connection of the cable ends of the attachment lines to the housing, such that the installation of the distributor arrangement is generally cumbersome and expensive.

SUMMARY

It is therefore an object of the present invention to provide an electrical distributor arrangement which can be installed inexpensively with little technical outlay.

This object is achieved, in the case of the electrical distributor arrangement mentioned in the introduction, in that the through lines are in the form of rigid current rails, wherein the attachment lines are fixedly connected in each case to one of the current rails.

Said object is furthermore achieved, in the case of the motor vehicle mentioned in the introduction, by way of an electrical distributor arrangement according to the present invention, wherein the attachment sockets are in each case electrically connected to one of the electrical terminals.

By virtue of the fact that the through lines are in the form of rigid current rails, it is possible for the through lines to be pre-installed and connected to corresponding electrical plug connections by way of the electrical terminals, wherein the attachment lines can, in the thus pre-installed state, be easily connected to the rigid current rails, such that the technical outlay for electrical contacting of the electrical attachment lines to the through lines is reduced overall.

This object of the present invention is thus achieved in its entirety.

In a preferred embodiment, the attachment lines are connected to the current rails in each case by way of a screw connection.

In this way, the attachment lines can be fixedly connected to the current rails with little technical outlay.

Here, it is particularly preferable for ring cable lugs to be fixed to the attachment lines for the purposes of fixedly connecting the attachment lines to the current rails.

In this way, the attachment lines can be electrically and mechanically connected to the current rails reliably with little technical outlay.

In a particular embodiment, the attachment lines are cohesively connected to the current rails in each case by way of a welded connection.

In this way, the attachment lines can be electrically and mechanically fixedly connected to the current rails with little technical outlay and without additional connecting elements.

In a preferred embodiment, the current rails in each case have a contacting blade at their ends.

In this way, the current rails can be reliably electrically connected to an attachment cable with little technical outlay, because the contacting blade can form a reliable electrical connection to an attachment cable.

Here, it is particularly preferable if the current rails are in the form of punched parts, and the ends are each in the form of contacting blades.

In this way, the current rails can be manufactured with little technical outlay and can form a reliable electrical contact.

It is furthermore preferable for the ends of the current rails to be led in each case through an opening in the housing.

In this way, the current rails can simultaneously form an electrical contact on an outer side of the housing, whereby the technical outlay can be further reduced.

It is furthermore preferable if the attachment lines are led through passage openings in the housing, which passage openings are formed separately from an installation opening of the housing.

In this way, the attachment lines can be led through the passage openings and connected at their ends to the current rails, such that the installation outlay is further reduced.

In a preferred embodiment, the attachment lines are pressed into the housing.

In this way, the attachment lines can be mechanically fixedly connected to the housing with little technical outlay.

In a preferred embodiment, the attachment lines are mechanically fixedly connected in each case to one of the current rails.

In this way, a both electrically and mechanically reliable connection to the current rails is possible.

It is furthermore preferable if the current rails are of elongate form and the electrical terminals are formed on opposite sides of the housing.

In this way, the electrical terminals of the housing can be arranged on opposite sides, whereby contacting is possible from opposite sides of the motor vehicle, such that compact electrical contacting in the motor vehicle is possible.

It is furthermore preferable if the attachment lines each have an electrically conductive sheathing, which sheathings are in each case electrically connected to the housing, wherein the housing is of electrically conductive form at least in regions.

In this way, the attachment lines can be electromagnetically shielded with respect to the surroundings, such that the electromagnetic compatibility can be improved.

Altogether, by way of the electrical distributor arrangement according to aspects of the invention, it is possible to provide reliable electrical contacting, with little technical outlay, of electrical components of the motor vehicle, wherein the installation outlay and thus manufacturing costs are reduced considerably owing to the rigid current rails and the fixed connection to the attachment lines.

It is self-evident that the features mentioned above and the features yet to be discussed below may be used not only in the respectively specified combination but also in other combinations or individually without departing from the scope of the present invention.

Exemplary embodiments of the invention are illustrated in the drawing and will be discussed in more detail in the following description.

DETAILED DESCRIPTION

Figure 1:
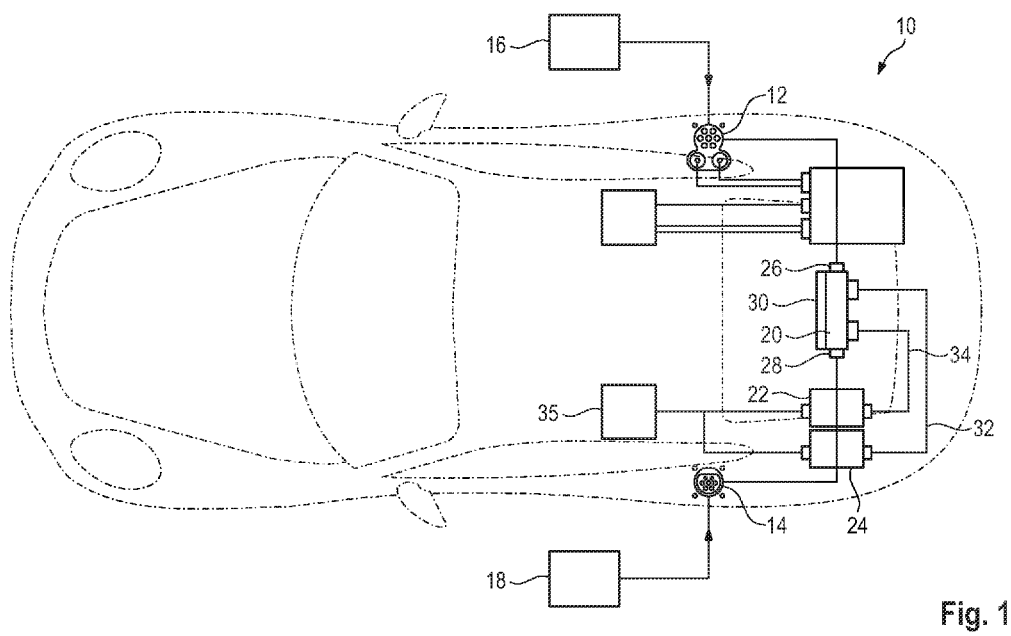
FIG. 1 shows a schematic view of a motor vehicle having an electrical distributor arrangement for the electrical contacting of different electrical consumers.

In FIG. 1, a motor vehicle is illustrated in a schematic plan view and denoted generally by 10. The motor vehicle 10 may be in the form of a purely electrically driven vehicle or else in the form of a motor vehicle with a hybrid drive, and generally has two electrical connecting sockets 12, 14 for the purposes of connecting the motor vehicle 10 in general electrically to one or two external electrical energy sources 16, 18, such as for example two charging stations 16, 18, and correspondingly supplying electrical energy to electrical consumers and/or electrical energy stores.

The attachment sockets 12, 14 are in each case electrically connected to an electrical distributor 20, wherein the electrical distributor 20 is electrically connected to two electrical consumers 22, 24 of the motor vehicle 10. The electrical distributor 20 serves generally for conducting or distributing an electrical voltage, and in particular an electrical high voltage, from the external electrical energy sources 16, 18 to the electrical consumers 22, 24.

The electrical distributor 20 has a first electrical terminal 26 and a second electrical terminal 28, via which the electrical distributor 20 is electrically connected to in each case one of the attachment sockets 12, 14. The electrical terminals 26, 28 are in the form of pin connectors and are fixedly connected to a housing 30 of the electrical distributor 20. The electrical terminals 26, 28 are connected, in the housing 30, to through lines of the electrical distributor 20, to which through lines there are attached electrical attachment lines 32, 34 for the purposes of electrically connecting the electrical consumers 22, 24 to the attachment sockets 12, 14 and to the external electrical energy sources 16, 18. The electrical consumers 22, 24 are preferably in the form of on-board charging units, and convert the electrical voltage, which is provided by the electrical energy sources 16, 18, into an electrical voltage of the vehicle 10, such that correspondingly connected electrical consumers 35 of the motor vehicle 10 can be supplied with a corresponding electrical voltage.

Figure 2:
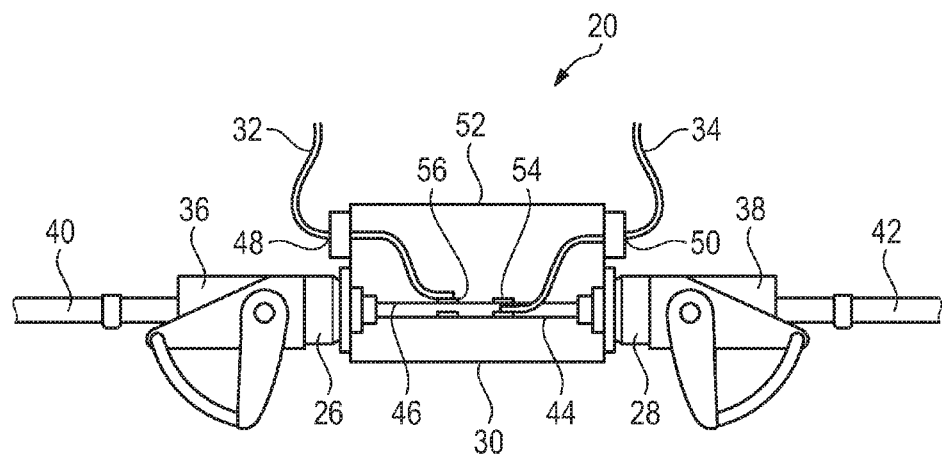
FIG. 2 shows a schematic sectional view of the electrical distributor arrangement.

In FIG. 2, the electrical distributor 20 is illustrated in a schematic sectional view. The electrical distributor 20 has the housing 30, on which the electrical terminals 26, 28 are formed. The electrical terminals 26, 28 are each connected to a plug 36, 38 or to a plug connector 36, 38 for the purposes of connecting the electrical distributor 20 via electrical lines 40, 42 in each case to the attachment sockets 12, 14. In the interior of the housing 30 there are arranged current rails 44, 46 which are in each case connected to the electrical terminals 26, 28 and which electrically connect the electrical terminals 26, 28 to one another and form the through lines. The current rails 44, 46 each have a contacting blade at their ends, or the ends of the current rails are in the form of contacting blades, for the purposes of facilitating an attachment of the electrical line 40, 42 and forming a reliable electrical connection. The current rails 44, 46 are preferably in the form of punched parts. The ends of the current rails 44, 46 are led through recesses in the housing 30 and, on an outer side of the housing 30, form in each case one of the electrical terminals 26, 28.

The electrical attachment lines 32, 34 are led through passage openings 48, 50 in the housing 30 and are electrically connected to the current rails 44, 46. On a side of the housing 30 which is situated opposite attachment points 54, 56 of the current rails 44, 46, there is formed an installation opening 52 for the purposes of connecting the electrical attachment lines 32, 34 to the current rails 44, 46. The installation opening 52 is formed separately from the passage openings 48, 50, such that the electrical attachment lines 32, 34 can be led through the passage openings 48, 50 and can be connected to the current rails 44, 46, without the leadthrough of the electrical attachment line 32, 34 during the installation process being impaired.

The electrical attachment lines 32, 34 are connected to the current rails 44, 46 preferably by way of cable lugs and a screw connection, or are alternatively connected to the current rails 44, 46 by way of a welded connection, such that a mechanically fixed and electrically reliable connection to the current rails 44, 46 can be formed. The electrical attachment lines 32, 34 are preferably welded to the current rails 44, 46 by way of ultrasound.

The electrical attachment lines 32, 34 each have an electrically conductive sheathing, which sheathings are in the form of an external shield line or an external electrically conductive mesh. The sheathings are in each case electrically connected to the electrically conductive housing 30, specifically at the passage openings 48, 50 through which the attachment lines 32, 34 are led. The attachment lines 32, 34 are preferably connected in each case by way of an electrically conductive sleeve to the passage openings 48, 50, wherein the sleeves are pushed over the respective sheathing and arranged and/or fixed in the passage openings 48, 50. In this way, the EMC characteristics can be improved overall.

By virtue of the fact that the current rails are led through the electrical terminals 26, 28, it is possible for existing component interfaces of conventional electrical distributors to be utilized, wherein it is merely necessary for the through lines to be replaced by the current rails 44, 46.

Figure 3:
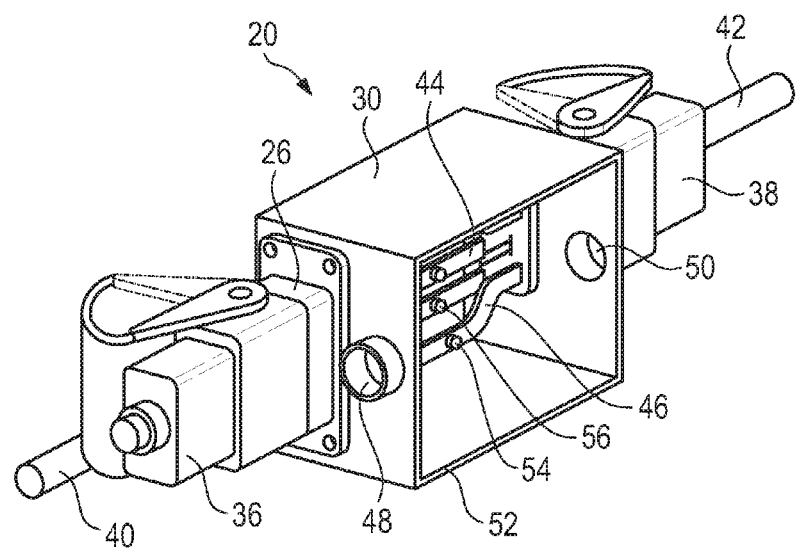
FIG. 3 is a perspective illustration of the electrical distributor arrangement from FIG. 2.

FIG. 3 illustrates a perspective view of the electrical distributor 20. Identical elements are denoted by the same reference designations, wherein here, only the special features will be discussed.

The current rails 44, 46 each have one or more of the attachment points 54, 56 which are formed on one side of the current rails 44, 46 for the purposes of electrically and mechanically contacting the electrical attachment lines 32, 34 with the current rails 44, 46. The attachment points 54, 56 are formed so as to be situated opposite the installation opening 52, such that installation of the electrical attachment line 32, 34 with the attachment points 54, 56 is possible with little technical outlay. In a particular embodiment, the electrical attachment lines 32, 34 may be pressed into the housing 30.

What is claimed is:

1. An electrical distributor arrangement for an electrically driven motor vehicle, comprising:
    a housing which has two electrical terminals which are connectable in each case to an external electrical energy source,
    a multiplicity of through lines which are connected at their ends in each case to one of the terminals, and
    a multiplicity of electrical attachment lines which are led into the housing for the purposes of electrically contacting a multiplicity of electrical consumers with the through lines, wherein the through lines are in the form of rigid current rails, wherein the attachment lines are fixedly connected in each case to one of the current rails.

2. The electrical distributor arrangement as claimed in claim 1, wherein the attachment lines are connected to the current rails in each case by way of a screw connection.

3. The electrical distributor arrangement as claimed in claim 1, wherein the attachment lines are connected to the current rails in each case by way of a welded connection.

4. The electrical distributor arrangement as claimed in claim 1, wherein the current rails in each case have a contacting blade at their ends.

5. The electrical distributor arrangement as claimed in claim 1, wherein the ends of the current rails are led in each case through an opening in the housing.

6. The electrical distributor arrangement as claimed in claim 1, wherein the attachment lines are led through passage openings in the housing, which passage openings are formed separately from an installation opening of the housing.

7. The electrical distributor arrangement as claimed in claim 1, wherein the attachment lines are mechanically fixedly connected in each case to one of the current rails.

8. The electrical distributor arrangement as claimed in claim 1, wherein the current rails are of elongate form and the electrical terminals are formed on opposite sides of the housing.

9. The electrical distributor arrangement as claimed in claim 1, wherein the attachment lines each have an electrically conductive sheathing, which sheathings are in each case electrically connected to the housing.

10. A motor vehicle, in particular an electrically driven motor vehicle, having two separate electrical attachment sockets for the purposes of electrically connecting the vehicle to one or multiple external electrical energy sources, and having an electrical distributor arrangement as claimed in claim 1, wherein the attachment sockets are in each case electrically connected to one of the electrical terminals.

* * * * *